US011809329B2

(12) United States Patent
Cariello

(10) Patent No.: US 11,809,329 B2
(45) Date of Patent: *Nov. 7, 2023

(54) RECOVERY OF LOGICAL-TO-PHYSICAL TABLE INFORMATION FOR A MEMORY DEVICE

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,794

(22) Filed: Oct. 12, 2022

(65) Prior Publication Data

US 2023/0106759 A1 Apr. 6, 2023

Related U.S. Application Data

(63) Continuation of application No. 17/127,147, filed on Dec. 18, 2020, now Pat. No. 11,500,782.

(51) Int. Cl.
   *G06F 11/10* (2006.01)
   *G06F 11/08* (2006.01)
   *G06F 12/1009* (2016.01)

(52) U.S. Cl.
   CPC ...... *G06F 12/1009* (2013.01); *G06F 11/1076* (2013.01); *G06F 2212/1032* (2013.01); *G06F 2212/657* (2013.01)

(58) Field of Classification Search
   CPC ............ G06F 12/1009; G06F 11/1076; G06F 2212/1032; G06F 2212/657
   See application file for complete search history.

(56) References Cited

U.S. PATENT DOCUMENTS 11,500,782 B2 * 11/2022 Cariello ............. G06F 12/1009
2017/0300246 A1 10/2017 Michaeli
(Continued)

FOREIGN PATENT DOCUMENTS

CN 109074228 A 12/2018

OTHER PUBLICATIONS

Gottscho et al, "Software-Defined ECC: Heuristic Recovery from Uncorrectable Memory Errors," published on Oct. 24, 2017 (15 pages).

(Continued)

*Primary Examiner* — Matthew M Kim
*Assistant Examiner* — Kyle Emanuele
(74) *Attorney, Agent, or Firm* — Holland & Hart LLP

(57) ABSTRACT

Methods, systems, and devices for recovery of logical-to-physical (L2P) table information for a memory device are described. A memory system may detect an error in one or more pointers of the L2P table using an error detecting code that is uncorrectable using the code. The memory system may determine a set of candidate codewords for the set of bits, where each of the candidate codewords includes one or more corresponding candidate pointers, and check whether a candidate codeword is correct based on whether a logical address corresponding to a candidate pointer of the candidate codeword matches a logical address stored as metadata for a set of data at a physical address pointed to by the candidate pointer. The memory system may limit the set of candidate codewords or order the candidate codewords for evaluate to reduce a latency associated with identifying a correct candidate codeword.

20 Claims, 6 Drawing Sheets

(56) References Cited

U.S. PATENT DOCUMENTS

2018/0173619 A1\* 6/2018 Sivasankaran ........ G06F 3/0679
2020/0081832 A1\* 3/2020 Hsu ........................ G06F 3/064
2022/0139482 A1   5/2022 Kim et al.

OTHER PUBLICATIONS

Chinese Patent Office, "Office Action", issued in connection with Chinese Patent Application No. 202111551032.7 dated Jan. 20, 2023 (13 pages) (5 pages Original and 8 pages English Translation.

\* cited by examiner

RECOVERY OF LOGICAL-TO-PHYSICAL TABLE INFORMATION FOR A MEMORY DEVICE

CROSS REFERENCE

The present Application for Patent is a continuation of U.S. patent application Ser. No. 17/127,147 by Cariello, entitled "RECOVERY OF LOGICAL-TO-PHYSICAL TABLE INFORMATION FOR A MEMORY DEVICE", filed Dec. 18, 2020, assigned to the assignee hereof, and is expressly incorporated by reference in its entirety herein.

FIELD OF TECHNOLOGY

The following relates generally to one or more systems for memory and more specifically to recovery of logical-to-physical table information for a memory device.

BACKGROUND

Memory devices are widely used to store information in various electronic devices such as computers, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
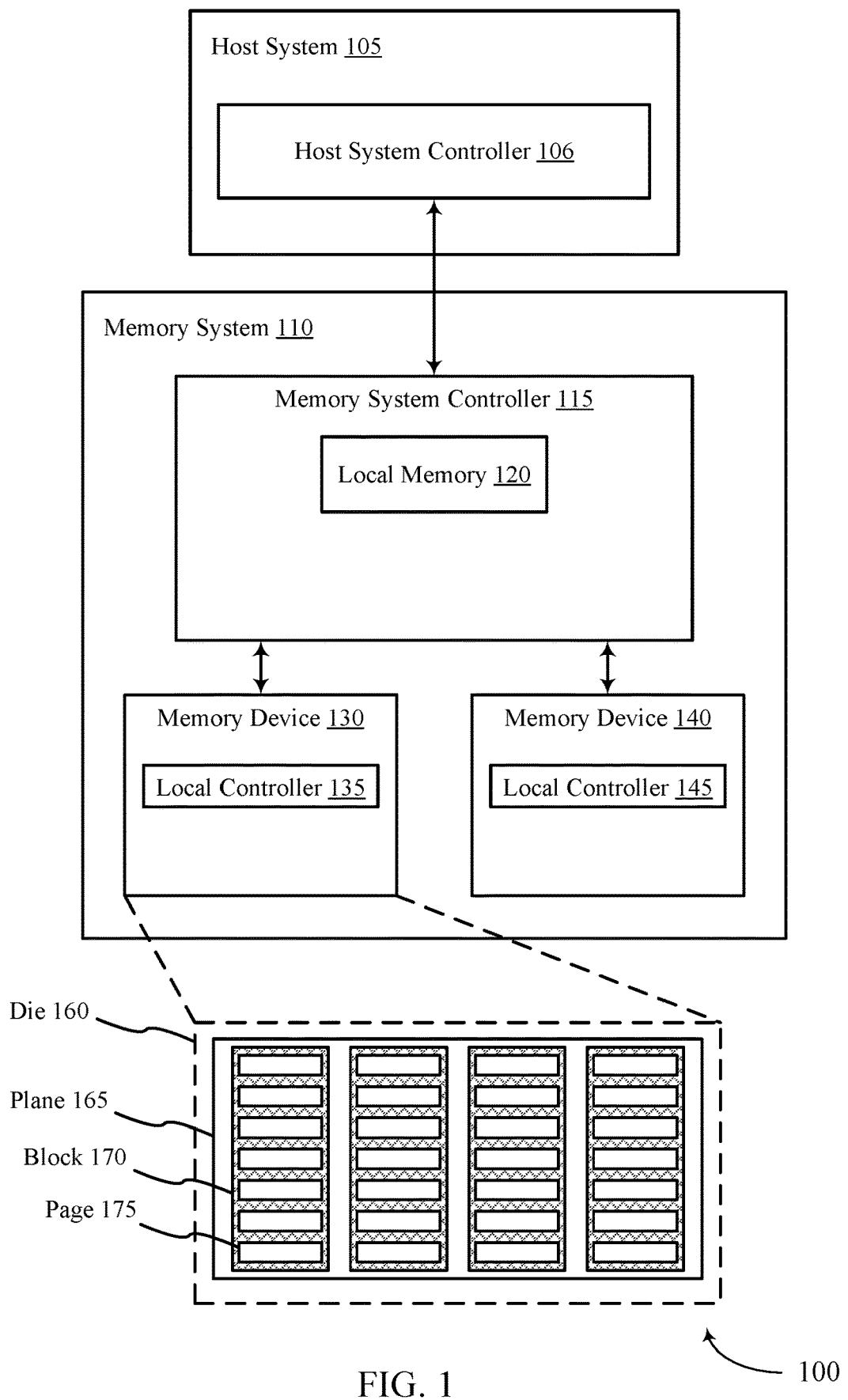
FIG. 1 illustrates an example of a system that supports recovery of logical-to-physical (L2P) table information for a memory device in accordance with examples as disclosed herein.

A memory system may be configured to store data within memory cells, where different groups of memory cells may have different physical addresses within a physical address space for the memory system. Different sets of data may be associated with different logical addresses within a logical address space, which may alternatively be referred to as a system address space or virtual address space, and which may be referenced by a host device in order to identify the different sets of data (e.g., read or write commands from the host device may indicate a corresponding set of data based on the logical address for the corresponding set of data). In some cases, a memory system may be organized as blocks of memory cells, and in some cases, a block of memory cells may be configured to store multiple sets of data each corresponding to a different logical block address (LBA) and stored within a different set of memory cells (e.g., a different group of memory cells within the block) having a corresponding physical block address (PBA).

A memory system may store and maintain a logical-to-physical (L2P) table indicating a mapping between logical addresses and the physical addresses at which sets of data having the logical addresses are stored. For example, the L2P table may include entries, which may be referred to herein as pointers or L2P pointers, and which each may indicate the physical address for a group of memory cells in which the data associated with a respective logical address for the entry is stored. In some cases, a pointer as described herein may be a set of bits that indicates a physical address within the physical address space, which may span any quantity of individual memory devices. For example, in some cases an L2P table may be an ordered list of physical addresses (e.g., PBAs), where each position within the L2P table corresponds to a respective logical address (e.g., LBA), and thus a physical address being listed in a particular position within the L2P table indicates that data associated with the logical address corresponding to the position is stored at memory cells having the indicated (e.g., listed) physical address. As used herein, an L2P table may refer to a single table or to multiple tables that collectively span a corresponding logical address space, a corresponding physical address space, or both.

In some cases, L2P pointers may be stored as codewords each corresponding to a respective error correcting and detecting code (e.g., a respective single error correcting and dual error detecting (SECDED) code). A codeword may include any quantity of one or more pointers. If the memory system detects an error in a codeword but is unable to correct the error, and the memory system is unable to recover the associated one or more L2P pointers, the memory system may be unable to identify the physical location at which data having the one or more corresponding logical addresses is stored, and thus the memory system may be unable to locate and read such data. This could result in a system fail or other adverse consequences (e.g., long latencies to scan up to an entire storage space to recover the data and the lost mapping information).

As described herein, to recover one or more L2P pointers associated with a corrupted codeword (e.g., a codeword in which an error is detected using an error detecting code that is not correctable using the code), a memory system may determine a set of candidate codewords for the corrupted codeword, where each candidate codeword may include one or more candidate pointers. Each candidate codeword may have a Hamming distance relative to the corrupted codeword that is equal to a quantity of bit errors in the corrupted codeword. The memory system may identify one of the candidate codewords as corresponding to a corrected version of the corrupted codeword by checking metadata associated with physical addresses pointed to by the candidate pointers of the candidate codewords to determine whether the logical address corresponding to a given candidate pointer matches a logical address stored in the metadata. Further, as described herein, the memory system may leverage one or more characteristics of L2P tables (e.g., a tendency for pointers to be sequential), of a physical address space, or both to reduce the latency with which a correct candidate codeword may be identified from the set of possible candidate codeword. Accordingly, the techniques herein may improve an ability of a memory system to recover corrupted L2P information (e.g., beyond the capability of an error correcting and detecting code that may otherwise be used), which may provide improved reliability, may reduce or avoid latencies associated with scanning a storage space to recover lost L2P information, or both, among other benefits that may be appreciated by one of ordinary skill in the art.

Features of the disclosure are initially described in the context of systems, devices, and circuits as described with reference to FIG. 1. Features of the disclosure are described in the context of decision flows as described with reference to FIGS. 2-4. These and other features of the disclosure are further illustrated by and described with reference to an apparatus diagram and flowcharts that relate to recovery of L2P table information for a memory device as described with reference to FIGS. 5-6.

FIG. 1 illustrates an example of a system 100 that supports recovery of L2P table information for a memory device in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a first type of non-volatile memory cells), and a memory device 140 may include one or more memory arrays of a second type of memory cells (e.g., a second type of non-volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface). The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., PBAs) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 in examples where the data is read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magnetic RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

A memory device 140 may include one or more arrays of memory cells, which may be a different type (e.g., a different non-volatile type) than the memory cells included in a memory device 130. For example, the memory device 140 may include ferroelectric random access memory (FeRAM) memory cells or memory cells that each include a chalcogenide storage element (e.g., arranged in a 3D crosspoint architecture), among other possibilities. In some examples, a memory device 140 may store information used by the memory system controller 115 or local controller 135 in connection with managing the operation of the memory device 130. It is to be understood, however, that any information described herein as potentially stored by the memory device 140 may alternatively be stored by the memory device 130 in some examples. For example, the memory device 140 storage may in some cases store an L2P table that comprises mapping information for mapping between logical addresses for sets of data stored by the memory device 130 (e.g., logical addresses that may be used by the host system 105 to reference (e.g., denote) the different sets of data) and corresponding physical addresses for the sets of memory cells within the memory device 130 at which valid versions of the sets of data are stored.

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P table to associate the logical address (e.g., LBA) for the data with the new, valid block 170 rather than the old, invalid block 170. In some cases, such copying and remapping may be preferable to erasing and rewriting the entire old block 170, due to latency or wearout considerations, for example. In some cases, one or more copies of an L2P table may be stored within the memory cells of the memory device 140 for use (e.g., reference and updating) by the memory system controller 115 or local controller 135.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support recovery of L2P table information for a memory device. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, in examples where the instructions are executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform associated functions as described herein.

In some examples, an error detection procedure may be performed on information included in an L2P table. For example, an error detecting code (e.g., an error correcting and detecting code, such as a SECDED code) may be used to detect and in some cases potentially correct errors within one or more L2P table pointers. An error detection procedure that uses a SECDED code may be capable of detecting up to double-bit errors and correcting single-bit errors. Errors may arise in information included in an L2P table, for example, while the information is stored in memory device 140 or local memory 120 (e.g., storage errors), in connection with transmitting the information from memory device 140 to memory system controller 115 (e.g., transmission errors), or any combination thereof.

Pointers within an L2P table may be stored as codewords, where each codeword may include one or more pointers, and where each codeword may correspond to a respective error detecting code (e.g., a respective SECDED code). In some examples, the memory system controller 115 may identify (e.g., detect) an uncorrectable error in a codeword of the L2P table. For instance, if using the SECDED code, the memory system controller 115 may detect that a codeword includes two bit errors but may be unable to precisely locate or correct those errors using the code alone. Rather, the memory system controller 115 may recover the corrupted L2P information using one or more recovery techniques as described herein.

In some examples, memory device 130 may store metadata for the sets of data stored therein, and the memory system controller 115 may use such metadata to recover corrupted pointers. For example, a set of data may be stored within the memory device 130 at a set of memory cells having a physical address, and related metadata may be stored within additional memory cells also corresponding to that physical address (e.g., the physical address may correspond to or otherwise be used to locate both memory cells that store the set of data and additional memory cells that store metadata for the set of data). The metadata stored within the memory device 130 for a set of data may include the logical address for the set of data. Thus, if the set of memory cells within the memory device 130 that stores a set of data are read, related metadata may be used by the memory system controller 115 to identify the logical address for the set of data, and to recover (e.g. regenerate) an L2P pointer for the set of data. However, because the physical location of a set of data corresponding to a corrupted pointer may be unknown, obtaining the metadata for such a set of data may potentially take a long time. For example, absent techniques described herein, obtaining the metadata for such a set of data may potentially involve scanning the entire memory device 130.

Such latencies may be avoided through the techniques described herein. For instance, the memory system controller 115 may determine a set of candidate codewords for the codeword with the bit errors, where each of the candidate codewords is associated with (e.g., includes) one or more corresponding candidate pointers (e.g., each candidate codeword may include a quantity of candidate pointers equal to the quantity of pointers included in the corrupted codeword). The memory system controller 115 may identify one of the candidate codewords as corresponding to the one or more entries of the L2P table based on checking, for each candidate pointer associated with the candidate codeword, the metadata stored within the memory device 130 for the set of data at the physical address indicated by the candidate pointer and verifying that the logical address associated with the candidate pointer matches the logical address indicated by the metadata. The memory system controller 115 may update the one or more entries of the L2P table to include the one or more candidate pointers associated with identified candidate codeword. As described herein, however, the memory system controller 115 may cull the set of candidate codewords for evaluation, may evaluate the set of candidate codewords in a particular order, or both in ways that may allow one or more corrupted L2P pointers to be recovered with decreased latency relative to scanning the entire memory device 130 or scanning the memory device 130 in some other order. As such, by performing the methods described herein, the controller may recover pointers with bit errors that are uncorrectable using an error correcting and detecting code, may avoid latencies associated with other L2P pointer recover techniques, or both, among other benefits that may be appreciated by one or ordinary skill in the art.

In some cases, in response to detecting an error in a codeword that includes one or more L2P pointers, the memory system controller 115 may generate a set of candidate codewords in which each candidate codeword is a set of bits with a Hamming distance N (e.g., N bits with different values) relative to the codeword in which the error was detected. For example, where a SECDED scheme is used to detect the error in the codeword, the memory system controller 115 may generate a set of candidate codewords that includes each codeword with a Hamming distance of two (2) (e.g., two altered bits) relative to the codeword in which the error was detected. Some of the candidate pointers included within the candidate codewords may, however, not correspond to valid physical addresses within the memory device 130 (e.g., may be a set of bits that don't comply with the format of physical addresses within the memory device 130, or would indicate a physical location that does not actually exist within the memory device 130, or both). A memory system controller 115 may skip checking metadata stored within the memory device 130 for candidate pointers that fail to correspond to any valid physical address, or the memory system controller 115 may cull the set of candidate codewords to exclude candidate codeword with at least one candidate pointer that fails to correspond to any valid physical address, either of which may decrease latency for recovering one or more corrupted L2P pointers.

Additionally or alternatively, a memory system controller 115 may leverage the tendency of L2P pointers within an L2P table to be sequential in order to evaluate candidate codewords in a particular order. For example, the usage pattern for the memory device 130 by the host system 105 may be such that sets of data associated with sequential (e.g., consecutive) logical addresses may often be written to physical locations within the memory device 130 having sequential (e.g., consecutive) physical addresses. Thus, if an error is detected in a candidate codeword, it may be assumed that the one or more corrupted (e.g. lost) L2P pointers included in the candidate codeword should most likely indicate physical addresses that are sequential either externally (e.g., with respect to the physical addresses indicated by immediately preceding or subsequent uncorrupted pointers within the L2P table) or internally (e.g., with respect to the one or more physical addresses indicated by one or more other candidate pointers within the same candidate codeword).

Accordingly, the memory system controller 115 may sort the candidate codewords such that the candidate codewords whose pointers are not internally or externally in a sequential order or have at least one candidate pointer with a higher value than those in a subsequent codeword or have a lower value than those in a previous codeword are checked later than those without these properties. As such, the memory system controller 115 may improve an order in which candidate codewords are checked, by which the memory system controller 115 may, on average, recover pointers more quickly.

Figure 2:
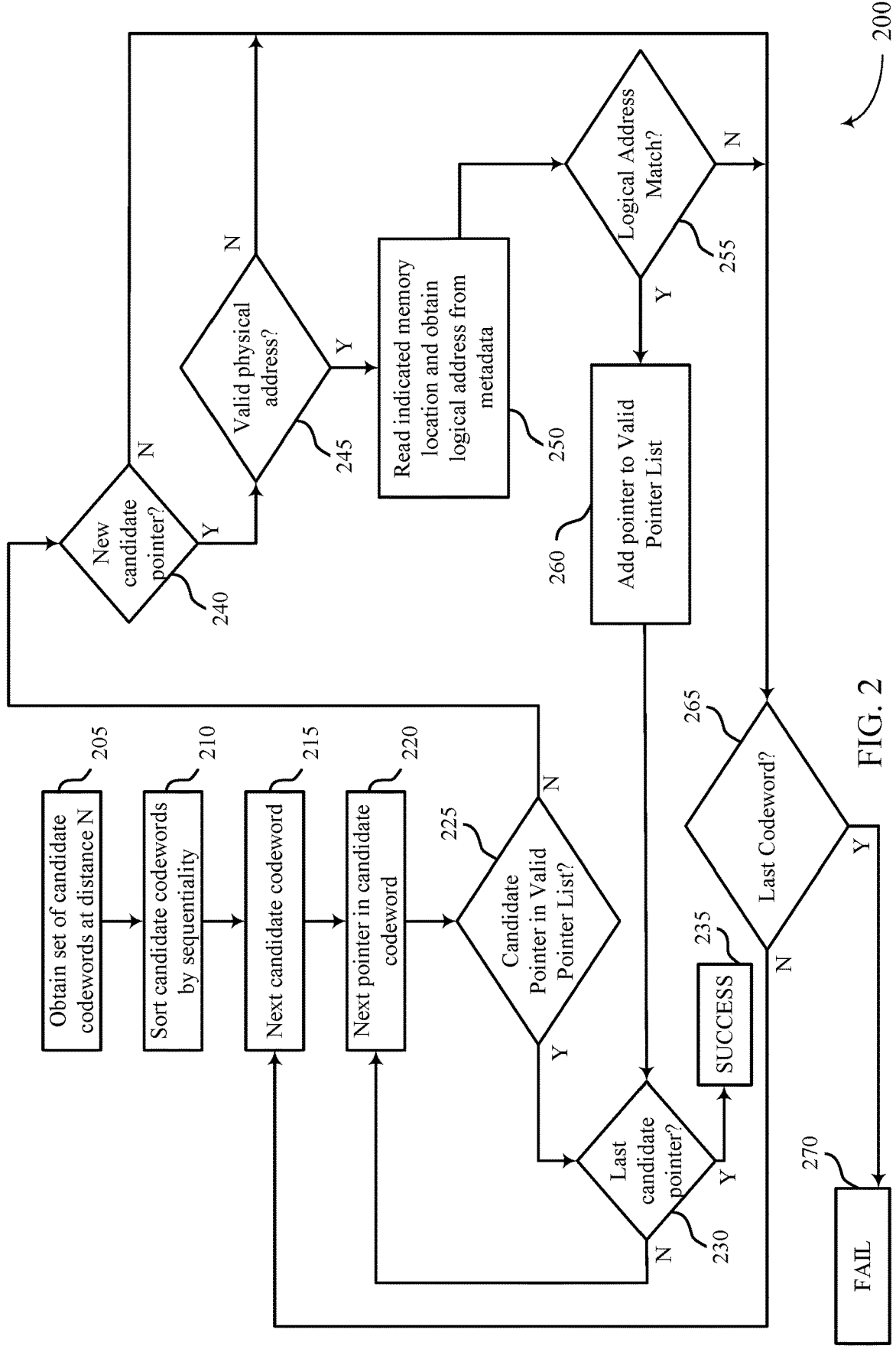
FIG. 2 illustrates an example of a decision flow that supports recovery of L2P table information for a memory device in accordance with examples as disclosed herein.

FIG. 2 illustrates an example of a decision flow 200 that supports recovery of L2P table information for a memory device in accordance with examples as disclosed herein. Aspects of the decision flow 200 may be implemented by a controller, among other components. Additionally or alternatively, aspects of the decision flow 200 may be implemented as instructions stored in memory (e.g., firmware stored in a memory coupled with memory system 110). For example, the instructions, in examples where the instructions are executed by a controller (e.g., a memory system controller 115), may cause the controller to perform the operations of the decision flow 200.

As described herein, a controller (e.g., a memory system controller 115) may identify an uncorrectable error in one or more entries (e.g., pointers) of an L2P table. The controller may identify the bit error after receiving a command (e.g., a read command or a write command) for accessing memory (e.g., memory device 130). For instance, after receiving the access command, the controller may consult the L2P table in order to identify and access a physical address corresponding to the logical address of the data associated with the command and may identify a bit error in a codeword associated with the L2P table while consulting the L2P table (e.g., according to a SECDED code). After identifying the bit error in the codeword, the controller may proceed to 205.

At 205, a set (e.g., list) of candidate codewords at a Hamming distance N from the codeword with the bit errors may be obtained. For instance, the controller may obtain a set (e.g., list) of candidate codewords at a Hamming distance N from the codeword with the bit errors. In some examples, if the codeword has two bit errors, then N may equal 2, and the controller may obtain a set of candidate codewords that are each the same as the codeword with bit errors except that a different set of N (e.g., 2) bits may be flipped relative to the codeword with bit errors.

At 210, the list of candidate codewords from the most sequential codeword to the least sequential codeword may be sorted. For instance, the controller may sort the list of candidate codewords. In some examples, the controller may sort the list of candidate codewords based on the extent to which the candidate pointers within the candidate codewords are externally sequential, internally sequential, or any combination thereof. Codewords that are less sequential may be those whose candidate pointers are not in a sequential order (e.g., are not strictly increasing or decreasing), whose candidate pointers have at least one candidate pointer with a higher value (e.g., that points to a higher physical block address) than one or more subsequent uncorrupted pointers within the L2P table (e.g., a pointer indexed immediately after the one or more pointers of the codeword with bit errors), or whose candidate pointers have at least one candidate pointer with a lower value (e.g., that points to a lower physical block address) than those in one or more previous uncorrupted pointers within the L2P table (e.g., a pointer indexed immediately before the one or more pointers of the codeword with bit errors), or both. For example, the less sequential the order within the codeword or the more candidate pointers that have at least one candidate pointer with a higher value than those in a subsequent codeword or a lower value than those in a previous codeword, the lower down that the candidate codewords may be sorted.

At 215, a first candidate codeword in the sorted list may be selected and at 220, a first candidate pointer in the first candidate codeword may be selected. For instance, the controller may select the first candidate pointer in the first candidate codeword At 225, whether the candidate pointer is in a valid pointer list (VPL) may be determined. For instance, the controller may determine whether the candidate pointer is in a VPL. If the candidate pointer is in the VPL, the controller may proceed to 230. However, if the candidate pointer is not in the VPL, the controller may proceed to 240. Initially, with respect to evaluating the first candidate pointer of the first candidate codeword, there may be no candidate pointers in the valid pointer list. As such, the controller may proceed to 240.

At 240, whether the candidate pointer is a new pointer (e.g., a candidate pointer that the controller has not evaluated so far) may be determined. For instance, the controller may determine whether the candidate pointer is a new pointer. If the candidate pointer is a new pointer, the controller may proceed to 245. If the candidate pointer is not a new pointer, the controller may proceed to 265. The controller may be evaluating the first candidate pointer of the first candidate codeword for the first time. As such, the controller may proceed to 245.

At 245, whether the candidate pointer maps to a valid physical address may be determined. For instance, the controller may determine whether the candidate pointer maps to a valid physical address. In some examples, the controller may determine whether a candidate pointer maps to a physical address within a physical address space (e.g., as opposed to an address outside of the physical address space or inconsistent with a format of physical addresses within the physical address space). In some cases, the controller may perform 245 as two or more steps. For instance, the controller may check for a valid physical page address associated with the candidate pointer and may check for a valid physical block address associated with the candidate pointer. If the candidate pointer maps to a valid physical address (e.g., a valid physical page address and a valid physical block address), the controller may proceed to 250. If the candidate pointer fails to map to a valid physical address (e.g., fails to map to a valid physical page address or a valid physical block address), the controller may proceed to 265. At 250, physical memory location pointed to by the candidate pointer may be read (e.g., memory cells within memory device 130 having a physical address indicated by the candidate pointer) and metadata associated with (e.g., stored at memory cells associated with) the physical memory location to obtain a logical address (e.g. LBA) for data stored at the pointed to memory location may be decoded. For instance, the controller may read the physical memory location and may decode the metadata The controller may then proceed to 255.

At 255, whether a logical address obtained from the metadata matches a logical address associated with the candidate pointer may be determined. For instance, the controller may determine whether a logical address obtained from metadata matches a logical address associated with the candidate pointer. In some examples, from position that the candidate pointer would occupy within the L2P table, the controller may determine a logical address that the candidate pointer is associated with. If the logical address indicated by the metadata stored at the physical location pointed to by the candidate pointer is different from the logical address associated with the candidate pointer, the controller may proceed to 265. However, if the logical address identified from the metadata is the same as (e.g., matches) the logical address associated with the candidate pointer (e.g., based on the potential position within the L2P table associated with the candidate pointer), the controller may proceed to 260. At 260, the candidate pointer may be added to the VPL. For instance, the controller may add the candidate pointer to the VPL.

From 260, the controller may proceed to 230. At 230, whether the candidate pointer is the last pointer of the codeword being evaluated may be determined. For instance, the controller may determine whether the candidate pointer is the last pointer of the codeword. If the candidate pointer is not the last candidate pointer, the controller may proceed to 220. For instance, if evaluating the first candidate codeword, the controller may at 220 select the second candidate pointer in the first candidate codeword. However, if the candidate pointer is the last pointer of the codeword being evaluated, the controller may proceed to 235. At 235, the L2P table may be updated to correct the one or more corrupted pointers of the L2P table included in the codeword for which an error was previously detected. For instance, the controller may update the L2P table. In some examples, in the present example, the controller may update the L2P table to include, in lieu of a corrupted pointer, the first candidate pointer of the first candidate codeword. Additionally, the controller may complete the access operation that prompted the controller consulting the L2P table and detecting the error.

At 265, whether the candidate codeword including the candidate pointer being evaluated is the last candidate codeword of the set obtained at 205 may be determined. For instance, the controller may determine whether the candidate codeword including the candidate pointer is the last candidate codeword. If the candidate codeword is not the last candidate codeword, the controller may proceed to 215. For instance, in the present example, the controller may select a first candidate pointer in a second candidate codeword. However, if the candidate codeword is the last candidate codeword of the list of candidate codewords obtained at 205, the controller may proceed to 270.

At 270, if a pointer of the codeword with bit errors is unable to be recovered and is for data requested by a host system, the host system (e.g., host system 105) may be informed that the data has been lost or may proceed to scan the entire memory device (e.g., memory device 130) in an attempt to recover the data, possibly with a related notification to the host device. For instance, the controller may inform the host system. In some cases, if any pointer of the codeword with bit errors is unable to be recovered, even if such a pointer is not specifically for data requested by the host system, the controller may inform the host system.

In some examples, the controller may read data from a memory device (e.g., memory device 130) and may check whether the logic address stored as metadata for the data matches the logical address associated with an L2P pointer used to locate and read the data. In such cases, the methods for L2P pointer recovery described herein may also be used in examples where such a logical address check fails (e.g., indicates a mismatch between the logical address of the L2P pointer and the logical address stored as metadata), even if no errors are detected for a codeword that includes the L2P pointer using an error detecting procedure (e.g., SECDED procedure). In some such examples, the controller may modify the methods as described herein to generate a set of candidate codewords for evaluation having a higher Hamming distance relative to a Hamming distance for the error detecting procedure (e.g., greater than 2 if the error detecting procedure is a SECDED procedure).

Figure 3:
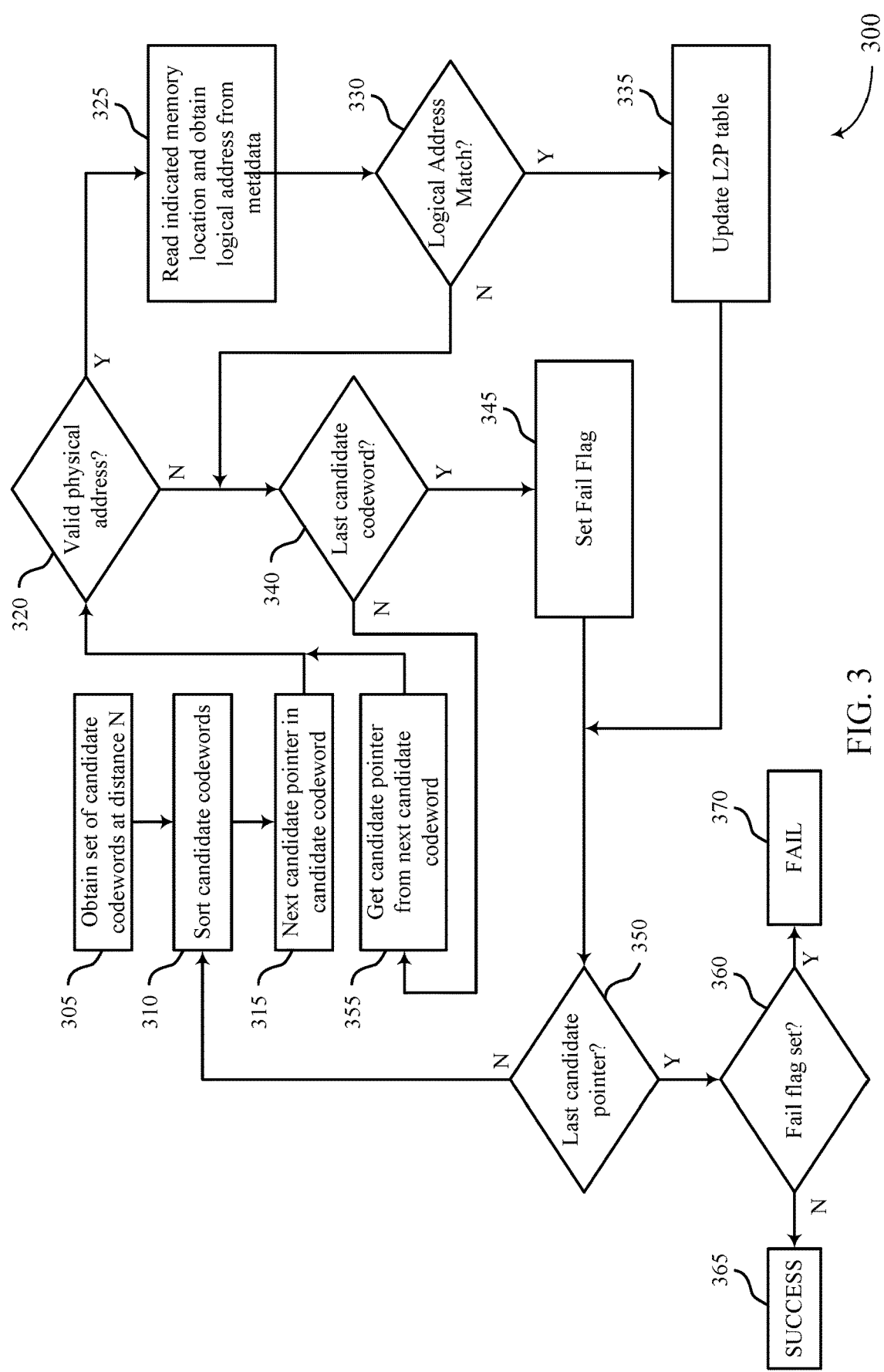
FIG. 3 illustrates an example of a decision flow that supports recovery of L2P table information for a memory device in accordance with examples as disclosed herein.

FIG. 3 illustrates an example of a decision flow 300 that supports recovery of L2P table information for a memory device in accordance with examples as disclosed herein. Aspects of the decision flow 300 may be implemented by a controller, among other components. Additionally or alternatively, aspects of the decision flow 300 may be implemented as instructions stored in memory (e.g., firmware stored in a memory coupled with memory system 110). For example, the instructions, in examples where the instructions are executed by a controller (e.g., a memory system controller 115), may cause the controller to perform the operations of the decision flow 300.

As described herein, a controller (e.g., a memory system controller 115) may identify an uncorrectable error in one or more entries (e.g., pointers) of an L2P table. The controller may identify the bit error after receiving a command (e.g., a read command or a write command) for accessing memory (e.g., memory device 130). For instance, after receiving the access command, the controller may consult the L2P table in order to identify and access a physical address corresponding to the logical address of the data associated with the command and may identify a bit error in a codeword associated with the L2P table while consulting the L2P table (e.g., according to a SECDED code). After identifying the bit error in the codeword, the controller may proceed to 305.

At 305, a set (e.g., list) of candidate codewords may be obtained at a Hamming distance N from the codeword with the bit errors. For instance, the controller may obtain the set of candidate codewords. In some examples, if the codeword has two bit errors, then N may equal 2, and the controller may obtain a set of candidate codewords that are each the same as the codeword with bit errors except that a different set of N (e.g., 2) bits may be flipped relative to the codeword with bit errors.

At 310, the list of candidate codewords may be sorted from the most sequential codeword to the least sequential codeword. For instance, the controller may sort the list of candidate codewords. In some examples, the controller may sort the list of candidate codewords based on the extent to which the candidate pointers within the candidate codewords are externally sequential, internally sequential, or both. Codewords that are less sequential may be those whose candidate pointers are not in a sequential order (e.g., are not strictly increasing or decreasing), whose candidate pointers have at least one candidate pointer with a higher value (e.g., that points to a higher physical block address) than one or more subsequent uncorrupted pointers within the L2P table (e.g., a pointer indexed immediately after the one or more pointers of the codeword with bit errors), or whose candidate pointers have at least one candidate pointer with a lower value (e.g., that points to a lower physical block address) than those in one or more previous uncorrupted pointers within the L2P table (e.g., a pointer indexed immediately before the one or more pointers of the codeword with bit errors), or both. The less sequential the order within the codeword or the more candidate pointers that have at least one candidate pointer with a higher value than those in a subsequent codeword or a lower value than those in a previous codeword, the lower down that the candidate codewords may be sorted.

At 315, a first candidate codeword in the sorted list may be selected. For instance, the controller may select the first candidate codeword. After selecting the first candidate codeword, the controller may proceed to 320. At 320, whether the candidate pointer maps to a valid physical address may be determined. For instance, the controller may determine whether the candidate pointer maps to a valid physical address. In some examples, the controller may determine whether a candidate pointer maps to a physical address within a physical address space (e.g., as opposed to an address outside of the physical address space or inconsistent with a format of physical addresses within the physical address space). In some cases, the controller may perform 320 as two or more steps. For instance, the controller may check for a valid physical page address associated with the candidate pointer and may check for a valid physical block address associated with the candidate pointer. If the candidate pointer maps to a valid physical address (e.g., a valid physical page address and a valid physical block address), the controller may proceed to 325. If the candidate pointer fails to map to a valid physical address (e.g., fails to map to a valid physical page address or a valid physical block address), the controller may proceed to 340. At 325, the physical memory location pointed to by the candidate pointer (e.g., memory cells within memory device 130 having a physical address indicated by the candidate pointer) may be read and metadata associated with (e.g., stored at memory cells associated with) the physical memory location to obtain a logical address (e.g. LBA) for data stored at the pointed to memory location may be decoded. In some examples, the controller may read the physical memory location and may decode the metadata. The controller may then proceed to 330.

At 330, whether the logical address obtained from the metadata matches a logical address associated with the candidate pointer may be determined. For instance, the controller may determine whether the logical address obtained from the metadata matches the logical address. In some examples, from position that the candidate pointer would occupy within the L2P table, the controller may determine a logical address that the candidate pointer is associated with. If the logical address indicated by the metadata stored at the physical location pointed to by the candidate pointer is different from the logical address associated with the candidate pointer, the controller may proceed to 340. However, if the logical address identified from the metadata is the same as (e.g., matches) the logical address associated with the candidate pointer (e.g., based on the potential position within the L2P table associated with the candidate pointer), the controller may proceed to 335. At 335, the L2P table may be updated with the candidate pointer (e.g., may replace a corrupted pointer with the candidate pointer). For instance, the controller may update the L2P table. From 335, the controller may proceed to 350.

At 340, whether the candidate codeword including the candidate pointer being evaluated is the last candidate codeword of the set obtained at 305 or 310 may be determined. For instance, the controller may determine whether the candidate codeword is the last candidate codeword. If the candidate codeword is not the last candidate codeword, the controller may proceed to 355, where the controller may get a pointer from a next candidate codeword. For instance, in the present example, the controller may select a first candidate pointer in a second candidate codeword. However, if the candidate codeword is the last candidate codeword of the list of candidate codewords obtained at 305 or 310, the controller may proceed to 345. At 345, a fail flag may be set to indicate that a candidate codeword has failed to be identified for which each included candidate pointer is valid. In some examples, the controller may set the fail flag to indicate that the controller has failed to identify a candidate codeword for which each included candidate pointer is valid. From 345, the controller may proceed to 350.

At 350, whether the candidate pointer is the last pointer of the codeword being evaluated may be determined. For instance, the controller may determine whether the candidate pointer is the last pointer of the codeword being evaluated. If the candidate pointer is not the last candidate pointer, the controller may proceed to 310. At 310, if it is a second or subsequent time that the process reaches 310 in response to the same detected error, and if the candidate pointer was deemed valid and the L2P table was updated (e.g., at 335) the candidate codewords may again be sorted (e.g., at least those that have yet to be evaluated) such that candidate codewords including the valid candidate pointer are to be checked before candidate codewords that lack the valid candidate pointer. For instance, the controller may sort the candidate codewords. In this manner, the controller may reduce the total amount of candidate codewords to be checked. From 310, the controller may proceed to 315. At 315, a next pointer in the candidate codeword may be selected. For instance, the controller may select the next pointer. In some examples, if evaluating the first candidate codeword, the controller may at 315 select the second candidate pointer in the first candidate codeword. In some examples, 315 may be performed before 310.

If, however, the candidate pointer is the last candidate pointer, the controller may at 350 proceed to 360. At 360, whether the fail flag is set may be determined. For instance, the controller may determine whether the fail flag is set. If the fail flag is not set (e.g., the controller had not previously set the flag at 345), the controller may proceed to 365. At 365, the access operation that prompted the controller consulting the L2P table and detecting the error may be completed. For instance, the controller may complete the access operation. If the fail flag is set (e.g., the controller had performed 345) and a pointer of the codeword with bit errors is unable to be recovered and is for data requested by a host system the controller may inform the host system (e.g., host system 105) that the data has been lost or may proceed to scan the entire memory device (e.g., memory device 130) in an attempt to recover the data, possibly with a related notification to the host device. In some cases, if the fail flag is set and any pointer of the codeword with bit errors is unable to be recovered, even if such a pointer is not specifically for data requested by the host system, the controller may inform the host system.

In some examples, the controller may read data from a memory device (e.g., memory device 130) and may check whether the logic address stored as metadata for the data matches the logical address associated with an L2P pointer used to locate and read the data. In such cases, the methods for L2P pointer recovery described herein may also be used in examples where such a logical address check fails (e.g., indicates a mismatch between the logical address of the L2P pointer and the logical address stored as metadata), even if no errors are detected for a codeword that includes the L2P pointer using an error detecting procedure (e.g., SECDED procedure). In some such examples, the controller may modify the methods as described herein to generate a set of candidate codewords for evaluation having a higher Hamming distance relative to a Hamming distance for the error detecting procedure (e.g., greater than 2 if the error detecting procedure is a SECDED procedure).

In some examples, a controller may perform the methods of FIG. 2 to detect the correct candidate codeword without performing a sort on candidate codewords more than once. In other examples, the controller may perform the methods of FIG. 3 to detect the correct candidate with potentially repeated sorting of the candidate codewords, which may lower (e.g. minimize) the distance to the correct codeword (e.g., the quantity of potential candidate codewords). In different scenarios, the controller may select to perform one of the methods of FIG. 2 or FIG. 3 over the other of the methods of FIG. 2 or FIG. 3.

Figure 4:
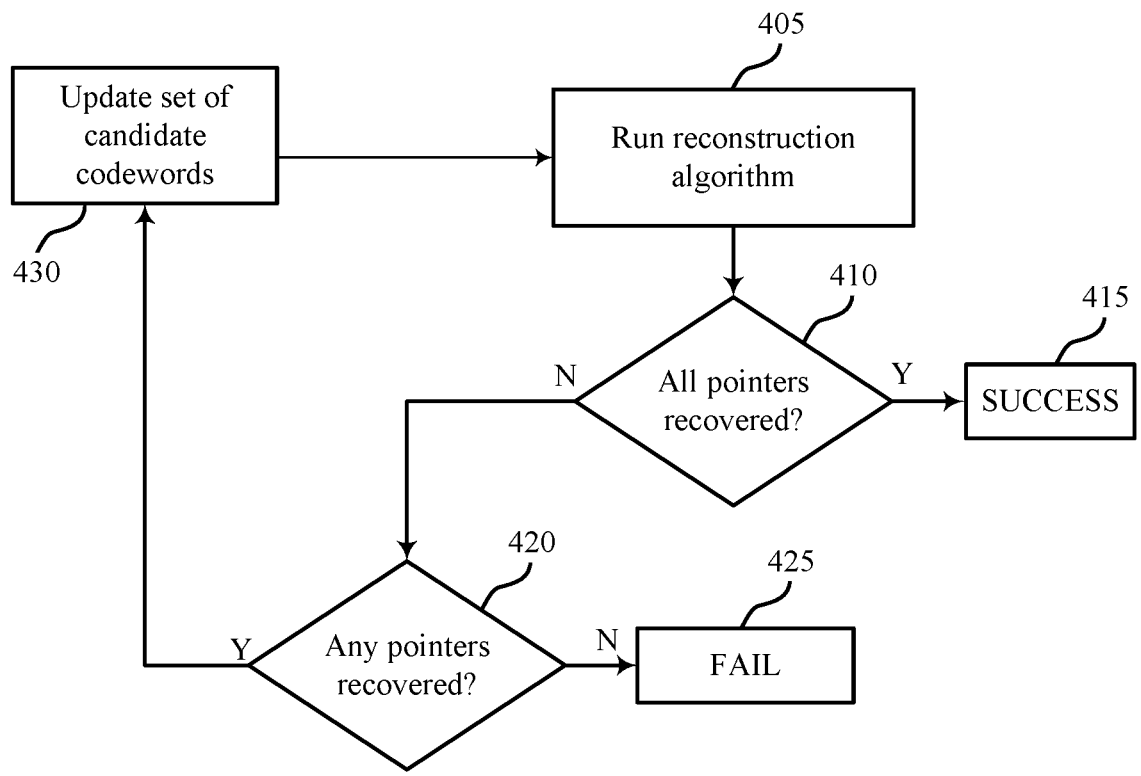
FIG. 4 illustrates an example of a decision flow that supports recovery of L2P table information for a memory device in accordance with examples as disclosed herein.

FIG. 4 illustrates an example of a decision flow 400 that supports recovery of L2P table information for a memory device in accordance with examples as disclosed herein. Aspects of the decision flow 400 may be implemented by a controller, among other components. Additionally or alternatively, aspects of the decision flow 400 may be implemented as instructions stored in memory (e.g., firmware stored in a memory coupled with memory system 110). For example, the instructions, in examples where the instructions are executed by a controller (e.g., a memory system controller 115), may cause the controller to perform the operations of the decision flow 400.

Decision flow 400 may be an example of a recursive method performed by a controller to recover the one or more L2P pointers included in a codeword in which an error is detected. As described herein, a controller (e.g., a memory system controller 115) may identify an uncorrectable error in one or more entries (e.g., pointers) of an L2P table. The controller may identify the bit error after receiving a command (e.g., a read command or a write command) for accessing memory (e.g., memory device 130). For instance, after receiving the access command, the controller may consult the L2P table in order to identify and access a physical address corresponding to the logical address of the data associated with the command and may identify a bit error in a codeword associated with the L2P table while consulting the L2P table (e.g., according to a SECDED code). After identifying the bit error in the codeword, the controller may proceed to 405.

At 405, a reconstruction algorithm may be run according to the methods of FIG. 2 and/or FIG. 3. For instance, the controller may run the reconstruction algorithm. From 405, the controller may proceed to 410. At 410, whether each pointer of a candidate codeword have been recovered using the reconstruction algorithm at 405 may be determined. For instance, the controller may determine whether each pointer of a candidate codeword have been determined. If the controller has recovered each pointer of a candidate codeword using the reconstruction algorithm, the controller may proceed to 415. At 415, an access operation that prompted the controller consulting the L2P table and detecting the error may be completed. For instance, the controller may complete the access operation. Additionally, in some examples, the controller may update the L2P table to correct the corrupted entries. At 410, if the controller fails to recover each pointer, the controller may proceed to 420.

At 420, whether any pointers were recovered using the reconstruction algorithm at 405 may be determined. For instance, the controller may determine whether any pointers were recovered. If so, the controller may proceed to 430. If not, the controller may proceed to 425. At 425, if a pointer of the codeword with bit errors is unable to be recovered and is for data requested by a host system, the host system may be informed (e.g., host system 105) that the data has been lost or may proceed to scan the entire memory device (e.g., memory device 130) in an attempt to recover the data, possibly with a related notification to the host device. For instance, the controller may inform the host system. In some cases, if any pointer of the codeword with bit errors is unable to be recovered, even if such a pointer is not specifically for data requested by the host system, the controller may inform the host system.

At 430, the set of candidate codewords may be updated. For instance, the controller may update the set of candidate codewords. For example, the controller may generate or otherwise identify a set of candidate codewords that each have a Hamming distance of N relative to the codeword in which the error was detected, but which each also include any valid pointer identified using the reconstruction algorithm at 405. Accordingly, if N bit errors were initially detected in the corrupted codeword of the L2P table, each of the updated set of candidate codewords may include N−1 bit errors. This may reduce the quantity of potentially impacted pointers within the codeword (e.g., a codeword with N bit errors may include up to N impacted pointers, while a codeword with N−1 bit errors may include up to N−1 impacted pointers). For example, if a double-bit error was initially detected in the corrupted codeword of the L2P table, potentially impacting two different pointers within the codeword, each of the updated set of candidate codewords may include a single bit error and thus a single pointer may remain for recovery. From 430, the controller may proceed to 405 and run the reconstruction algorithm (according to the methods of FIG. 2 and/or FIG. 3) another time, which due to the updated set of candidate codewords, may result in each pointer being recovered. Alternatively, in some examples, after 430, a SECDED code may be used to detect how many bit errors the codeword may have. For instance, the controller may use the SECDED code to detect how many bit errors the codeword may have. If the codeword has one bit error, the controller may correct the one bit error using the SECDED code and may proceed to 415.

Figure 5:
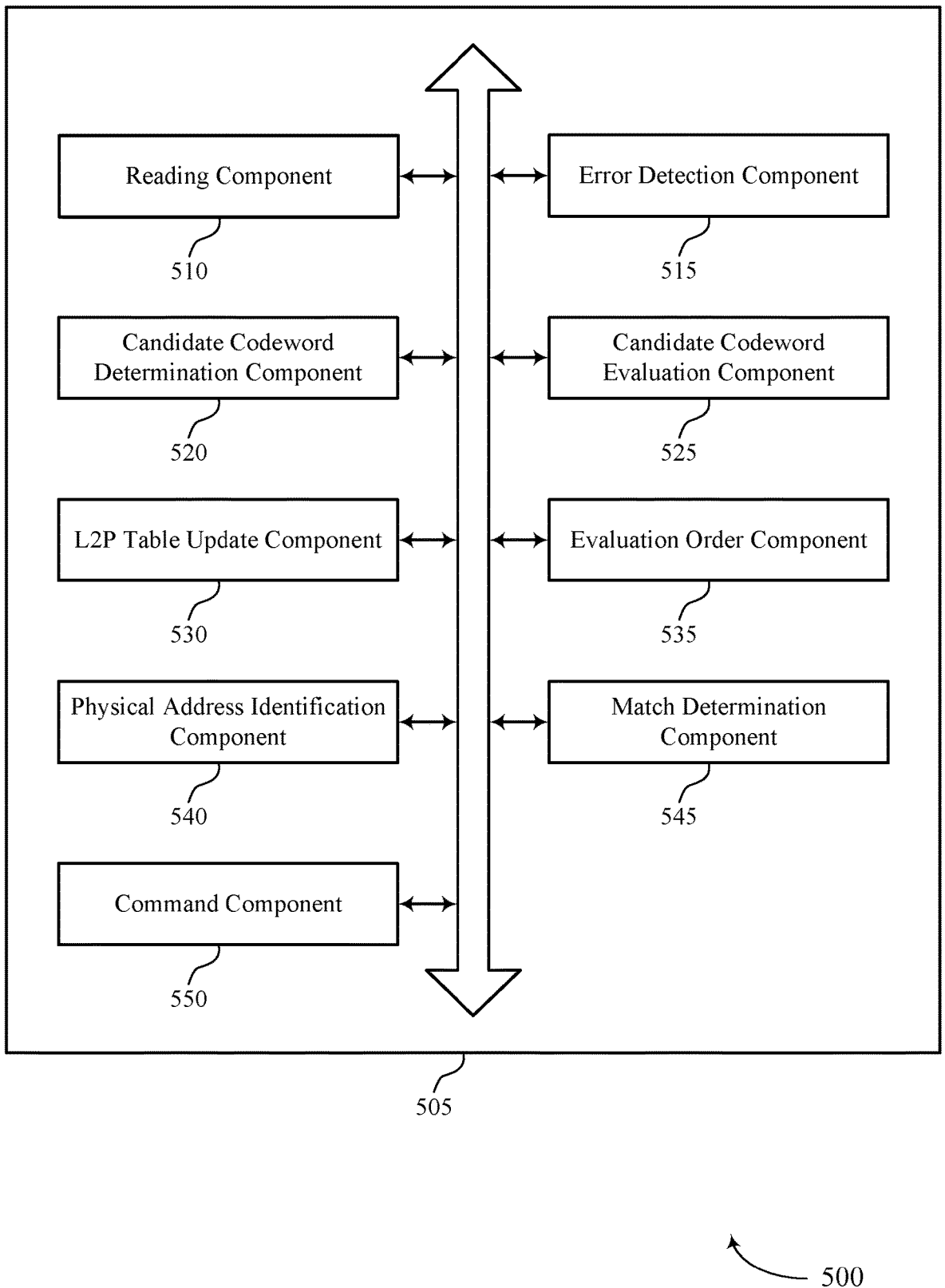
FIG. 5 shows a block diagram of a memory system that supports recovery of L2P table information for a memory device in accordance with examples as disclosed herein.

FIG. 5 shows a block diagram 500 of a memory system 505 that supports recovery of L2P table information for a memory device in accordance with examples as disclosed herein. The memory system 505 may be an example of aspects of a memory system as described with reference to FIGS. 1 through 4. The memory system 505, or various components thereof, may be an example of means for performing various aspects of recovery of L2P table information for a memory device as described herein. For example, the memory system 505 may include a reading component 510, an error detection component 515, a candidate codeword determination component 520, a candidate codeword evaluation component 525, a L2P table update component 530, an evaluation order component 535, a physical address identification component 540, a match determination component 545, a command component 550, or any combination thereof. Each of these components may communicate, directly or indirectly, with one another (e.g., via one or more buses).

The reading component 510 may be configured as or otherwise support a means for reading a set of bits including one or more entries of an L2P table for a memory array, where the one or more entries each include a corresponding pointer that maps from a corresponding logical address to a corresponding physical address of the memory array. The error detection component 515 may be configured as or otherwise support a means for detecting, based at least in part on an error correcting and detecting code, an error in the set of bits that is uncorrectable using the code. The candidate codeword determination component 520 may be configured as or otherwise support a means for determining, based at least in part on detecting the error, a set of candidate codewords for the set of bits, where each of the candidate codewords is associated with one or more corresponding candidate pointers. The candidate codeword evaluation component 525 may be configured as or otherwise support a means for identifying one of the candidate codewords as corresponding to the one or more entries of the L2P table based at least in part on the identified candidate codeword being associated with one or more candidate pointers that each map between a valid corresponding logical address and a valid corresponding physical address of the memory array. The L2P table update component 530 may be configured as or otherwise support a means for updating the one or more entries of the L2P table to include the one or more candidate pointers associated with the identified candidate codeword.

In some examples, the evaluation order component 535 may be configured as or otherwise support a means for determining an order for evaluating the candidate codewords, where a location of a candidate codeword within the order is based at least in part on whether the one or more corresponding candidate pointers for the candidate codeword correspond to a sequential set of physical addresses. In some examples, the candidate codeword evaluation component 525 may be configured as or otherwise support a means for evaluating one or more of the candidate codewords according to the determined order until the one of the candidate codewords is identified.

In some examples, the evaluation order component 535 may be configured as or otherwise support a means for determining an order for evaluating the candidate codewords, where a location of a candidate codeword within the order is based at least in part on whether the one or more corresponding candidate pointers for the candidate codeword correspond to one or more physical addresses that are sequential with respect to one or more other entries of the L2P table. In some examples, the candidate codeword evaluation component 535 may be configured as or otherwise support a means for evaluating one or more of the candidate codewords according to the determined order until the one of the candidate codewords is identified.

In some examples, to support determining whether a candidate pointer associated with the identified candidate codeword maps between a valid corresponding logical address and a valid corresponding physical address for the candidate pointer, the physical address identification component 540 may be configured as or otherwise support a means for identifying a physical address indicated by the candidate pointer. In some examples, to support determining whether a candidate pointer associated with the identified candidate codeword maps between a valid corresponding logical address and a valid corresponding physical address for the candidate pointer, the reading component 510 may be configured as or otherwise support a means for reading data from a set of memory cells within the memory array, where the set of memory cells corresponds to the physical address, and where the data includes a stored logical address. In some examples, to support determining whether a candidate pointer associated with the identified candidate codeword maps between a valid corresponding logical address and a valid corresponding physical address for the candidate pointer, the match determination component 545 may be configured as or otherwise support a means for determining a match between the stored logical address and the corresponding logical address for the candidate pointer. The candidate pointer may be determined as mapping between a valid corresponding logical address and a valid corresponding physical address in the event of a match, and the candidate pointer may be determined as not mapping between a valid corresponding logical address and a valid corresponding physical address in the event of a mismatch (e.g., no match).

In some examples, the candidate codeword evaluation component 525 may be configured as or otherwise support a means for determining whether the physical address indicated by the candidate pointer is within a physical address space for the memory array, where the controller is configured to cause the apparatus to read the data from the set of memory cells within the memory array based at least in part on determining that the physical address is within the physical address space for the memory array.

In some examples, the candidate codeword evaluation component 525 may be configured as or otherwise support a means for updating a list of valid pointers to include the candidate pointer based at least in part on determining the match.

In some examples, the candidate codeword evaluation component 525 may be configured as or otherwise support a means for determining, before reading the data from the set of memory cells within the memory array, that the list of valid pointers lacks the candidate pointer.

In some examples, to support determining whether each candidate pointer associated with the one of the candidate codewords maps between a valid corresponding logical address and a valid corresponding physical address, the candidate codeword evaluation component 545 may be configured as or otherwise support a means for determining whether each candidate pointer of the one of the candidate codewords is included in a list of valid pointers.

In some examples, the candidate codeword evaluation component 525 may be configured as or otherwise support a means for determining, based at least in part on evaluating a second one of the candidate codewords, that a first candidate pointer of the second one of the candidate codewords maps from a first valid logical address to a first valid physical address and that a second candidate pointer of the second one of the candidate codewords fails to map from any valid logical address, fails to map to any valid physical address, or both. In some examples, the candidate codeword determination component 520 may be configured as or otherwise support a means for selecting an updated set of candidate codewords based at least in part evaluating the second one of the candidate codewords, where each candidate codeword of the updated set includes the first candidate pointer and excludes the second candidate pointer. In some examples, the candidate codeword evaluation component 525 may be configured as or otherwise support a means for evaluating one or more candidate codewords of the updated set until the one of the candidate codewords is identified.

In some examples, the command component 550 may be configured as or otherwise support a means for receiving a command to read or write data associated with a logical address, where the controller is configured to cause the apparatus to read the set of bits including the one or more entries of the L2P table in response to the command. In some examples, the candidate codeword evaluation component 525 may be configured as or otherwise support a means for identifying a set of memory cells within the memory array based at least in part on a candidate pointer associated with the identified candidate codeword, the identified set of memory cells having a physical address indicated by the candidate pointer. In some examples, the reading component 510 may be configured as or otherwise support a means for reading the data from or writing the data to the set of memory cells.

In some examples, the reading component 510 may be configured as or otherwise support a means for reading the set of bits including the one or more entries of the L2P table from a second memory array, which may be coupled with the controller. In some examples, the memory array may include memory cells of a first type, and the second memory array may include memory cells of a second type. In some examples, the memory cells of the first type may be NAND memory cells, and the memory cells of the second type may be ferroelectric or chalcogenide memory cells. In some examples, the error correcting and detecting code may be a SECDED code.

Figure 6:
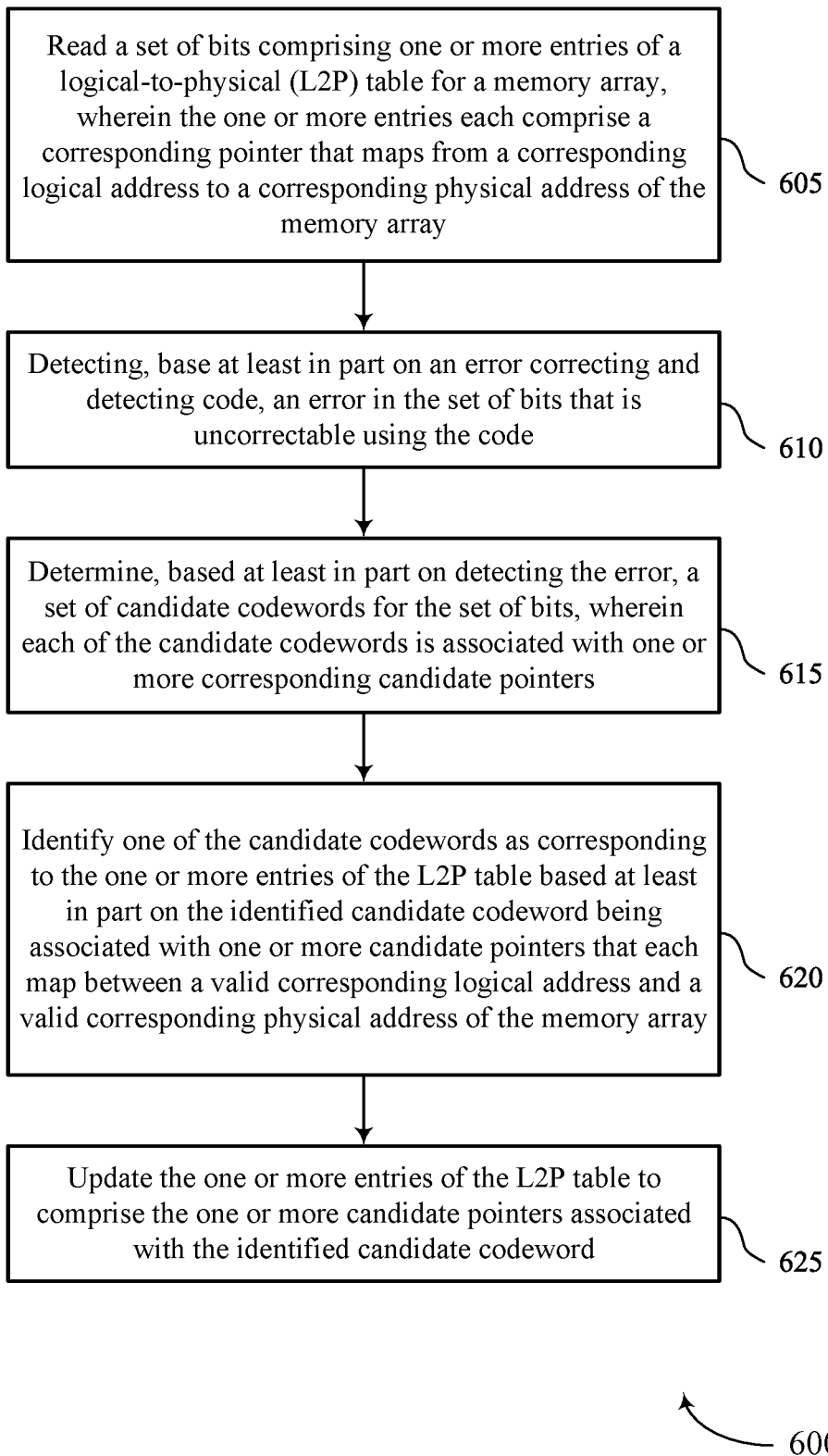
FIG. 6 shows a flowchart illustrating a method or methods that support recovery of L2P table information for a memory device in accordance with examples as disclosed herein.

FIG. 6 shows a flowchart illustrating a method 600 that supports recovery of L2P table information for a memory device in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include reading a set of bits including one or more entries of an L2P table for a memory array, where the one or more entries each include a corresponding pointer that maps from a corresponding logical address to a corresponding physical address of the memory array. The operations of 605 may be performed in accordance with examples as disclosed herein. In some examples, aspects of the operations of 605 may be performed by a reading component 530 as described with reference to FIG. 5.

At 610, the method may include detecting, based at least in part on an error correcting and detecting code, an error in the set of bits that is uncorrectable using the code. The operations of 610 may be performed in accordance with examples as disclosed herein. In some examples, aspects of the operations of 610 may be performed by an error detection component 535 as described with reference to FIG. 5.

At 615, the method may include determining, based at least in part on detecting the error, a set of candidate codewords for the set of bits, where each of the candidate codewords is associated with one or more corresponding candidate pointers. The operations of 615 may be performed in accordance with examples as disclosed herein. In some examples, aspects of the operations of 615 may be performed by a candidate codeword determination component 540 as described with reference to FIG. 5.

At 620, the method may include identifying one of the candidate codewords as corresponding to the one or more entries of the L2P table based at least in part on the identified candidate codeword being associated with one or more candidate pointers that each map between a valid corresponding logical address and a valid corresponding physical address of the memory array. The operations of 620 may be performed in accordance with examples as disclosed herein. In some examples, aspects of the operations of 620 may be performed by a candidate codeword evaluation component 545 as described with reference to FIG. 5.

At 625, the method may include updating the one or more entries of the L2P table to include the one or more candidate pointers associated with the identified candidate codeword. The operations of 625 may be performed in accordance with examples as disclosed herein. In some examples, aspects of the operations of 625 may be performed by a L2P table update component 550 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for reading a set of bits including one or more entries of an L2P table for a memory array, where the one or more entries each include a corresponding pointer that maps from a corresponding logical address to a corresponding physical address of the memory array, detecting, based at least in part on an error correcting and detecting code, an error in the set of bits that is uncorrectable using the code, determining, based at least in part on detecting the error, a set of candidate codewords for the set of bits, where each of the candidate codewords is associated with one or more corresponding candidate pointers, identifying one of the candidate codewords as corresponding to the one or more entries of the L2P table based at least in part on the identified candidate codeword being associated with one or more candidate pointers that each map between a valid corresponding logical address and a valid corresponding physical address of the memory array, and updating the one or more entries of the L2P table to include the one or more candidate pointers associated with the identified candidate codeword.

Some examples of the method 600 and the apparatus described herein may further include operations, features, circuitry, logic, means, or instructions for determining an order for evaluating the candidate codewords, where a location of a candidate codeword within the order may be based at least in part on whether the one or more corresponding candidate pointers for the candidate codeword correspond to a sequential set of physical addresses, and evaluating one or more of the candidate codewords according to the determined order until the one of the candidate codewords is identified.

Some examples of the method 600 and the apparatus described herein may further include operations, features, circuitry, logic, means, or instructions for determining an order for evaluating the candidate codewords, where a location of a candidate codeword within the order may be based at least in part on whether the one or more corresponding candidate pointers for the candidate codeword correspond to one or more physical addresses that may be sequential with respect to one or more other entries of the L2P table, and evaluating one or more of the candidate codewords according to the determined order until the one of the candidate codewords is identified.

In some examples of the method 600 and the apparatus described herein, the operations, features, circuitry, logic, means, or instructions for determining whether a candidate pointer associated with the identified candidate codeword maps between a valid corresponding logical address and a valid corresponding physical address for the candidate pointer may include operations, features, circuitry, logic, means, or instructions for identifying a physical address indicated by the candidate pointer, reading data from a set of memory cells within the memory array, where the set of memory cells corresponds to the physical address, and where the data includes a stored logical address, and determining whether there is a match between the stored logical address and the corresponding logical address for the candidate pointer.

Some examples of the method 600 and the apparatus described herein may further include operations, features, circuitry, logic, means, or instructions for determining whether the physical address indicated by the candidate pointer is within a physical address space for the memory array, where the controller may be configured to cause the apparatus to read the data from the set of memory cells within the memory array based at least in part on determining that the physical address is within the physical address space for the memory array.

Some examples of the method 600 and the apparatus described herein may further include operations, features, circuitry, logic, means, or instructions for updating a list of valid pointers to include the candidate pointer based at least in part on determining the match.

Some examples of the method 600 and the apparatus described herein may further include operations, features, circuitry, logic, means, or instructions for determining, before reading the data from the set of memory cells within the memory array, that the list of valid pointers lacks the candidate pointer.

In some examples of the method 600 and the apparatus described herein, the operations, features, circuitry, logic, means, or instructions for determining whether each candidate pointer associated with the one of the candidate codewords maps between a valid corresponding logical address and a valid corresponding physical address may include operations, features, circuitry, logic, means, or instructions for determining whether each candidate pointer of the one of the candidate codewords is included in a list of valid pointers.

Some examples of the method 600 and the apparatus described herein may further include operations, features, circuitry, logic, means, or instructions for determining, based at least in part on evaluating a second one of the candidate codewords, that a first candidate pointer of the second one of the candidate codewords maps from a first valid logical address to a first valid physical address and that a second candidate pointer of the second one of the candidate codewords fails to map from any valid logical address, fails to map to any valid physical address, or both, selecting an updated set of candidate codewords based at least in part evaluating the second one of the candidate codewords, where each candidate codeword of the updated set includes the first candidate pointer and excludes the second candidate pointer, and evaluating one or more candidate codewords of the updated set until the one of the candidate codewords is identified.

Some examples of the method 600 and the apparatus described herein may further include operations, features, circuitry, logic, means, or instructions for receiving a command to read or write data associated with a logical address, where the controller may be configured to cause the apparatus to read the set of bits including the one or more entries of the L2P table in response to the command, identifying a set of memory cells within the memory array based at least in part on a candidate pointer associated with the identified candidate codeword, the identified set of memory cells having a physical address indicated by the candidate pointer, and reading the data from or writing the data to the set of memory cells.

Some examples of the method 600 and the apparatus described herein may further include operations, features, circuitry, logic, means, or instructions for reading the set of bits including the one or more entries of the L2P table from a second memory array, which may be coupled with the controller.

In some examples of the method 600 and the apparatus described herein, the memory array may include memory cells of a first type, and the second memory array may include memory cells of a second type.

In some examples of the method 600 and the apparatus described herein, the memory cells of the first type may be NAND memory cells, and the memory cells of the second type include ferroelectric or chalcogenide memory cells.

In some examples of the method 600 and the apparatus described herein, the error correcting and detecting code may be a SECDED code.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory array, a controller coupled with the memory array and configured to cause the apparatus to, read a set of bits including one or more entries of an L2P table for the memory array, where the one or more entries each include a corresponding pointer that maps from a corresponding logical address to a corresponding physical address of the memory array, detect, based at least in part on an error correcting and detecting code, an error in the set of bits that is uncorrectable using the code, determine, based at least in part on detecting the error, a set of candidate codewords for the set of bits, where each of the candidate codewords is associated with one or more corresponding candidate pointers, identify one of the candidate codewords as corresponding to the one or more entries of the L2P table based at least in part on the identified candidate codeword being associated with one or more candidate pointers that each map between a valid corresponding logical address and a valid corresponding physical address of the memory array, and update the one or more entries of the L2P table to include the one or more candidate pointers associated with the identified candidate codeword In some examples of the apparatus, the controller may be further configured to cause the apparatus to determine an order for evaluating the candidate codewords, where a location of a candidate codeword within the order may be based at least in part on whether the one or more corresponding candidate pointers for the candidate codeword correspond to a sequential set of physical addresses and evaluate one or more of the candidate codewords according to the determined order until the one of the candidate codewords is identified.

In some examples of the apparatus, the controller may be further configured to cause the apparatus to determine an order for evaluating the candidate codewords, where a location of a candidate codeword within the order may be based at least in part on whether the one or more corresponding candidate pointers for the candidate codeword correspond to one or more physical addresses that may be sequential with respect to one or more other entries of the L2P table and evaluate one or more of the candidate codewords according to the determined order until the one of the candidate codewords is identified.

In some examples of the apparatus, to determine whether a candidate pointer associated with the identified candidate codeword maps between a valid corresponding logical address and a valid corresponding physical address for the candidate pointer, the controller may be configured to cause the apparatus to identify a physical address indicated by the candidate pointer, read data from a set of memory cells within the memory array, where the set of memory cells corresponds to the physical address, and where the data includes a stored logical address, and determine whether there is a match between the stored logical address and the corresponding logical address for the candidate pointer.

In some examples of the apparatus, the controller may be further configured to cause the apparatus to determine whether the physical address indicated by the candidate pointer is within a physical address space for the memory array, where the controller may be configured to cause the apparatus to read the data from the set of memory cells within the memory array based at least in part on determining that the physical address is within the physical address space for the memory array.

In some examples of the apparatus, the controller may be further configured to cause the apparatus to update a list of valid pointers to include the candidate pointer based at least in part on determining the match.

In some examples of the apparatus, the controller may be further configured to cause the apparatus to determine, before reading the data from the set of memory cells within the memory array, that the list of valid pointers lacks the candidate pointer.

In some examples of the apparatus, to determine whether each candidate pointer associated with the one of the candidate codewords maps between a valid corresponding logical address and a valid corresponding physical address, the controller may be configured to cause the apparatus to determine whether each candidate pointer of the one of the candidate codewords is included in a list of valid pointers.

In some examples of the apparatus, the controller may be further configured to cause the apparatus to determine, based at least in part on evaluating a second one of the candidate codewords, that a first candidate pointer of the second one of the candidate codewords maps from a first valid logical address to a first valid physical address and that a second candidate pointer of the second one of the candidate codewords fails to map from any valid logical address, fails to map to any valid physical address, or both, select an updated set of candidate codewords based at least in part evaluating the second one of the candidate codewords, where each candidate codeword of the updated set includes the first candidate pointer and excludes the second candidate pointer, and evaluate one or more candidate codewords of the updated set until the one of the candidate codewords may be identified.

In some examples of the apparatus, the controller may be further configured to cause the apparatus to receive a command to read or write data associated with a logical address, where the controller may be configured to cause the apparatus to read the set of bits including the one or more entries of the L2P table in response to the command, identify a set of memory cells within the memory array based at least in part on a candidate pointer associated with the identified candidate codeword, the identified set of memory cells having a physical address indicated by the candidate pointer, and reading the data from or writing the data to the set of memory cells.

Some examples of the apparatus may further include a second memory array coupled with the controller, where the controller may be configured to cause the apparatus to read the set of bits including the one or more entries of the L2P table from the second memory array.

In some examples of the apparatus, the memory array may include memory cells of a first type, and the second memory array may include memory cells of a second type.

In some examples of the apparatus, the memory cells of the first type may be NAND memory cells, and the memory cells of the second type may be ferroelectric or chalcogenide memory cells.

In some examples of the apparatus, the error correcting and detecting code may be a SECDED code.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "if," "when," "based on," or "based at least in part on" may be used interchangeably. In some examples, if the terms "if," "when," "based on," or "based at least in part on" are used to describe a conditional action or connection between portions of a process, the terms may be interchangeable. In some examples, if used to describe a conditional action or process, the terms "if," "when," "based on," or "based at least in part on," may be interchangeable. The term "in response to" may refer to one step or action occurring at least partially, if not fully, as a result of a previous step or action. For example, a first step or action may be performed and second step or action may at least partially occur as a result of the previous step or action occurring (whether directly after or after one or more other intermediate steps or actions occurring after the first step or action). Additionally, the terms "directly in response to" or "in direct response to" may refer to one step or action occurring as a result of a previous step or action. For example, a first step or action may be performed and second step or action may occur directly as a result of the previous step or action occurring (such that no other intermediate steps or actions occurring after the earliest step or action would occur before the second step or action). Any step or action described herein as being performed based at least in part on or in response to some other step, action, event, or condition may alternatively (e.g., in an alternative example) be performed in direct response to such other step, action, event, or condition unless otherwise specified.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a controller configured to cause the apparatus to:
read a set of bits comprising one or more entries of a logical-to-physical (L2P) table, wherein the one or more entries each comprise a corresponding pointer that maps from a corresponding logical address to a corresponding physical address;
detect, based at least in part on an error correcting and detecting code, an error in the set of bits that is uncorrectable using the code; and
update the one or more entries of the L2P table to comprise one or more candidate pointers associated with a candidate codeword of a set of candidate codewords for the set of bits based at least in part on the one or more candidate pointers of the candidate codeword each mapping between a valid corresponding logical address and a valid corresponding physical address.

2. The apparatus of claim 1, further comprising:
one or more memory arrays, wherein the controller is for the one or more memory arrays, and wherein the L2P table is for the one or more memory arrays.

3. The apparatus of claim 1, further comprising:
a first memory array and a second memory array, wherein the controller is configured to cause the apparatus to read the set of bits comprising the one or more entries of the L2P table from the second memory array, and wherein the valid corresponding physical address associated with each of the one or more candidate pointers is within the first memory array.

4. The apparatus of claim 3, wherein the first memory array comprises memory cells of a first type, and wherein the second memory array comprises memory cells of a second type.

5. The apparatus of claim 4, wherein the memory cells of the first type comprise not-and (NAND) memory cells, and wherein the memory cells of the second type comprise ferroelectric or chalcogenide memory cells.

6. The apparatus of claim 1, wherein the error correcting and detecting code comprises a single-error correcting and double-error detecting (SECDED) code.

7. The apparatus of claim 1, wherein updating the one or more entries of the L2P table to comprise the one or more candidate pointers is based at least in part on detecting the error in the set of bits that is uncorrectable using the code.

8. An apparatus, comprising:
 one or more memory arrays; and
 a controller for the one or more memory arrays, and the controller configured to cause the apparatus to:
  read a set of bits comprising one or more entries of a logical-to-physical (L2P) table for the one or more memory arrays, wherein the one or more entries each comprise a corresponding pointer that maps from a corresponding logical address to a corresponding physical address within the one or more memory arrays; and
  update the one or more entries of the L2P table to comprise one or more candidate pointers associated with a candidate codeword of a set of candidate codewords for the set of bits based at least in part on the one or more candidate pointers of the candidate codeword each mapping between a valid corresponding logical address and a valid corresponding physical address within the one or more memory arrays.

9. The apparatus of claim 8, wherein the controller is further configured to cause the apparatus to:
 detect an error in the set of bits, wherein updating the one or more entries of the L2P table to comprise the one or more candidate pointers is based at least on detecting the error in the set of bits.

10. The apparatus of claim 9, wherein, to detect the error in the set of bits, the controller is configured to cause the apparatus to:
 detect, based at least in part on a code, the error in the set of bits that is uncorrectable using the code, wherein updating the one or more entries of the L2P table to comprise the one or more candidate pointers is based at least in part on detecting the error in the set of bits that is uncorrectable using the code.

11. The apparatus of claim 9, wherein the error comprises two or more bits of the set of bits being erroneous.

12. The apparatus of claim 8, wherein the controller is further configured to cause the apparatus to:
 detect that a codeword associated with the one or more entries is corrupted, wherein updating the set of candidate codewords is based at least in part on detecting that the codeword is corrupted, and wherein the candidate codeword of the set of candidate codewords is distinct from the codeword that is corrupted.

13. The apparatus of claim 12, wherein each candidate codeword of the set of candidate codewords has Hamming distance equal to a quantity of bit errors in the codeword that is corrupted.

14. An apparatus, comprising:
 one or more memory arrays;
 a controller for the one or more memory arrays, the controller configured to cause the apparatus to:
  detect, based at least in part on an error correcting and detecting code, an error in a set of bits that is uncorrectable using the code, wherein the set of bits comprises one or more entries of logical-to-physical (L2P) table for the one or more memory arrays, and wherein the one or more entries each comprise a corresponding pointer that maps from a corresponding logical address to a corresponding physical address within the one or more memory arrays; and
  update the one or more entries of the L2P table to comprise one or more candidate pointers associated with a candidate codeword of a set of candidate codewords for the set of bits based at least in part on the one or more candidate pointers of the candidate codeword each mapping between a valid corresponding logical address and a valid corresponding physical address within the one or more memory arrays.

15. The apparatus of claim 14, wherein the controller is further configured to cause the apparatus to:
 evaluate one or more of the set of candidate codewords according to an order of evaluation until the candidate codeword whose one or more candidate pointers each map between the valid corresponding logical address and the valid corresponding physical address is evaluated, wherein a location of the candidate codeword within the order of evaluation is based at least in part on whether the one or more corresponding candidate pointers for the candidate codeword correspond to a sequential set of physical addresses.

16. The apparatus of claim 14, wherein the controller is further configured to cause the apparatus to:
 evaluate one or more of the set of candidate codewords according to an order of evaluation until the candidate codeword whose one or more candidate pointers each map between the valid corresponding logical address and the valid corresponding physical address is evaluated, wherein a location of the candidate codeword within the order of evaluation is based at least in part on whether the one or more corresponding candidate pointers for the candidate codeword correspond to one or more physical addresses that are sequential with respect to one or more other entries of the L2P table.

17. The apparatus of claim 14, wherein the controller is further configured to:
 read, for each candidate pointer of the one or more candidate pointers, data from a respective set of memory cells within the one or more memory arrays, wherein the respective set of memory cells are associated with the corresponding physical address, wherein the data comprises a respective stored logical address, and wherein updating the one or more entries of the L2P table is based at least in part on a match between the respective stored logical address and the corresponding logical address for the candidate pointer.

18. The apparatus of claim 17, wherein the controller is configured to read, for each candidate pointer of the one or more candidate pointers, the data from the respective set of memory cells based at least in part on the corresponding physical address being within a physical address space for the one or more memory arrays.

19. The apparatus of claim 17, wherein the controller is further configured to cause the apparatus to:
update, for each candidate pointer of the one or more candidate pointers, a list of valid pointers to include the candidate pointer based at least in part on the match.

20. The apparatus of claim 19, wherein the controller is configured to read, for each candidate pointer of the one or more candidate pointers, the data from the respective set of memory cells based at least in part on the list of valid pointers lacking the candidate pointer.

* * * * *